United States Patent
Lorenzen

(10) Patent No.: US 7,949,334 B2
(45) Date of Patent: May 24, 2011

(54) METHOD AND SYSTEM FOR DETERMINING THE DEPENDENCE BETWEEN DEVICE PARAMETERS OF A MOBILE TELEPHONE AND SIGNAL PARAMETERS

(75) Inventor: Rolf Lorenzen, Unterhaching (DE)

(73) Assignee: Rohde & Schwarz GmbH & Co. KG, München (DE)

( * ) Notice: Subject to any disclaimer, the term of this patent is extended or adjusted under 35 U.S.C. 154(b) by 327 days.

(21) Appl. No.: 12/095,874

(22) PCT Filed: Jul. 10, 2007

(86) PCT No.: PCT/EP2007/006101
§ 371 (c)(1),
(2), (4) Date: Jul. 15, 2008

(87) PCT Pub. No.: WO2008/009373
PCT Pub. Date: Jan. 24, 2008

(65) Prior Publication Data
US 2009/0131039 A1    May 21, 2009

(30) Foreign Application Priority Data
Jul. 17, 2006  (DE) .......................... 10 2006 032 961

(51) Int. Cl.
*H04W 24/00* (2009.01)
(52) U.S. Cl. ........ 455/425; 455/418; 455/420; 455/423; 455/424; 455/67.11; 455/67.13; 455/67.14; 455/67.7; 455/68; 455/115.1; 455/115.2; 455/226.1
(58) Field of Classification Search .......... 455/418–420, 455/423–425, 67.11–67.15, 67.7, 68–69, 455/115.1–115.4, 226.1–226.4
See application file for complete search history.

(56) References Cited

U.S. PATENT DOCUMENTS
6,233,437 B1 * 5/2001 Klenner ...................... 455/115.2
(Continued)

FOREIGN PATENT DOCUMENTS
| FR | 2 861 945 | 5/2005 |
| WO | WO 00/40049 | 7/2000 |
| WO | WO 2005/043946 | 5/2005 |
| WO | WO 2006/034843 | * 4/2006 |

OTHER PUBLICATIONS
International Search Report for PCT/EP2007/006101 dated Nov. 21, 2007.

*Primary Examiner* — Tuan A Tran
(74) *Attorney, Agent, or Firm* — Marshall, Gerstein & Borun LLP

(57) ABSTRACT

A method and a system for determining the dependence between several device-parameter values in each case of at least one device parameter of a mobile telephone ($3_1, 3_2, \ldots, 3_m, 3_n$) and at least one signal parameter of a signal transmitted and/or received by the mobile telephone ($3_1, 3_2, \ldots, 3_m, 3_n$) adjusts several device-parameter values within a mobile telephone ($3_1, 3_2, \ldots, 3_m, 3_n$) of at least one device parameter of the respective mobile telephone ($3_1, 3_2, \ldots, 3_m, 3_n$) for a given number of frequencies of the respectively transmitted and/or received signal, and measures the associated signal parameters of a signal transmitted and/or received by the respective mobile telephone ($3_1, 3_2, \ldots, 3_m, 3_n$). All of the frequencies and the device-parameter values of at least one device parameter respectively associated with every frequency are present in the respective mobile telephone ($3_1, 3_2, \ldots, 3_m, 3_n$) at the start of the measurements.

20 Claims, 12 Drawing Sheets

U.S. PATENT DOCUMENTS

| | | |
|---|---|---|
| 6,525,657 B1 * | 2/2003 | Wojcik .......................... 340/514 |
| 6,856,802 B1 * | 2/2005 | Kinnunen et al. ............. 455/425 |
| 6,947,709 B2 * | 9/2005 | Kaindl .......................... 455/67.7 |
| 7,035,594 B2 * | 4/2006 | Wallace et al. ............. 455/67.12 |
| 7,206,549 B2 * | 4/2007 | Lin et al. .................... 455/67.11 |
| 7,496,361 B1 * | 2/2009 | Mitchell et al. ................ 455/423 |
| 7,756,516 B2 * | 7/2010 | Steffen et al. ................. 455/425 |
| 7,773,964 B2 * | 8/2010 | Ozaki et al. ................. 455/226.1 |
| 2002/0077093 A1 | 6/2002 | Maloney et al. |
| 2006/0194552 A1 | 8/2006 | Jin et al. |

* cited by examiner

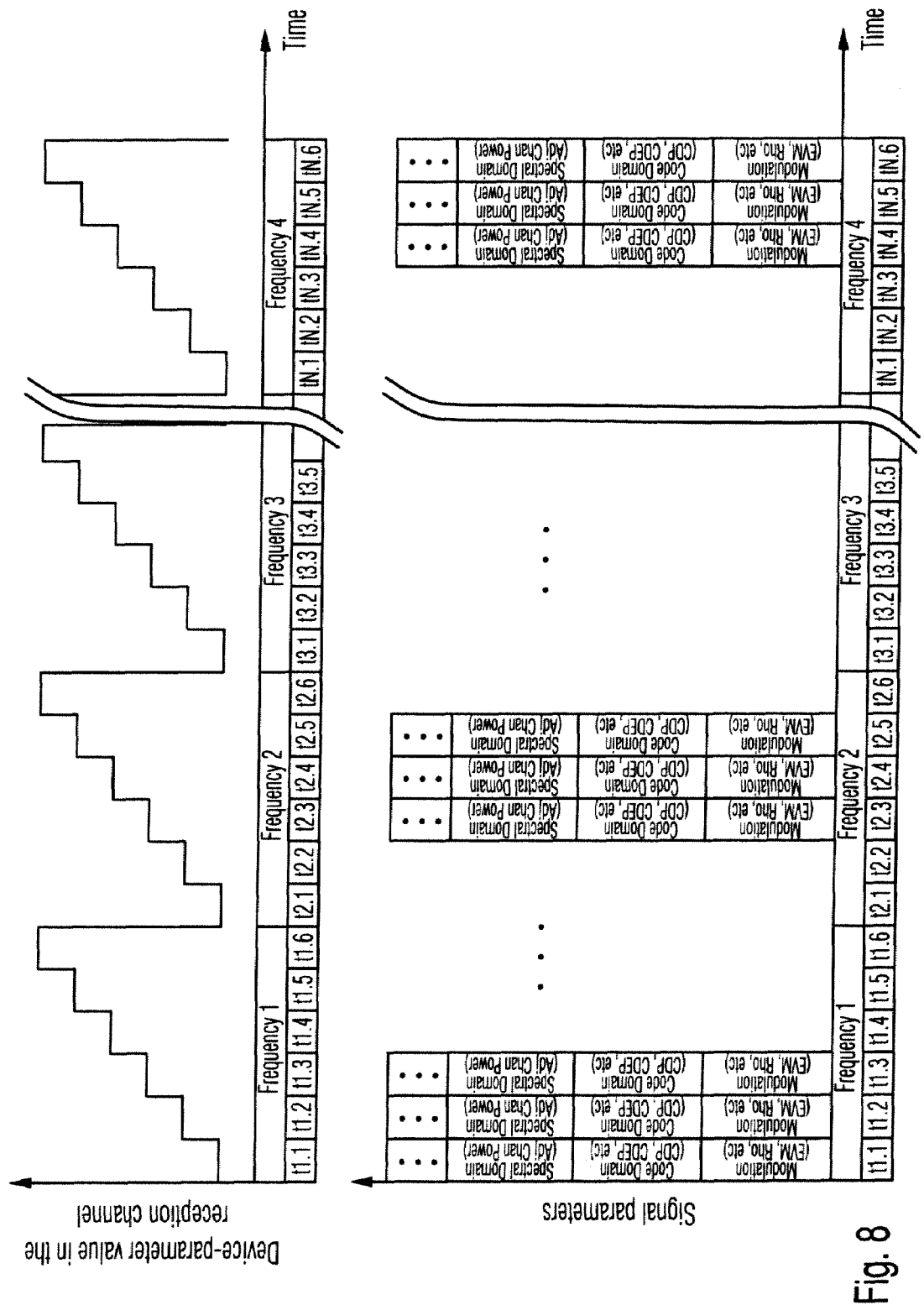

METHOD AND SYSTEM FOR DETERMINING THE DEPENDENCE BETWEEN DEVICE PARAMETERS OF A MOBILE TELEPHONE AND SIGNAL PARAMETERS

BACKGROUND OF THE INVENTION

1. Field of the Invention

The invention relates to a method and a system for determining the dependence between device parameters of a mobile telephone and signal parameters of a signal transmitted and/or received by the mobile telephone.

2. Related Technology

One important stage in the manufacture of mobile telephones, which is implemented in order to identify faulty mobile telephones at the end of the manufacturing process, is testing the quality of different signal parameters, for example, the error-modulation vector (EMV) or the code-domain parameters (CDP) of the signal transmitted or received by the mobile telephone under test dependent upon given device-parameter values in the reception and/or transmission channel of the mobile telephone, such as the offset voltage of the reception or transmission amplifier. For this purpose, the measured signal parameters are compared with threshold values, which define the correct tolerance range.

In the case of purely static-process tests, in which the continuously-measured values of the individual signal parameters of the signals transmitted and/or received by mobile telephones are merely archived for evaluation at a subsequent time, a comparison of threshold values and the consequent separation of faulty mobile telephones are not required.

For both fields of application, identification of faulty mobile telephones and static-process measurement of process parameters, a short testing time is desirable in addition to high-precision testing. Particularly in the context of tests, in which the mobile telephone must be measured with regard to several signal parameters of the transmitted and received signal over a plurality of transmission and reception frequencies and respectively over a plurality of device-parameter values of several device parameters, the testing time can have a negative influence.

The frequency and signal level of the signal received by the mobile telephone are conventionally transmitted from a superordinate procedural-control unit to the measuring instrument, and the frequency and signal level of the signal transmitted by the mobile telephone are transmitted to the mobile telephone together with the device-parameter values of a device parameter to be set in the mobile telephone, and, after triggering with subsequent synchronization of the measuring instrument with the mobile telephone, the measurements of the individual, relevant signal parameters of the transmitted and/or received signal of the mobile telephone are then registered by the measuring instrument.

Transmission times for the transmission of the individual frequencies and signal level of the transmitted and/or received signal to be tested and for the individual device-parameter values in some cases of several device parameters of the mobile telephone are also disadvantageously added to the actual testing time. This significantly increases the total time for measuring all signal parameters of the signal transmitted and/or received in all frequencies.

GENERAL DESCRIPTION OF THE INVENTION

The invention is therefore based upon the object of providing a method and a system for testing a mobile telephone, with which the overall testing time for measuring the dependence of several signal parameters of a signal transmitted or received by the mobile telephone upon several device-parameter values in some cases of several device parameters of the mobile telephone is significantly reduced by comparison with the prior art.

The invention provides a method for determining the dependence between device parameters of a mobile telephone and signal parameters of a signal transmitted and/or received by the mobile telephone and by a system for determining the dependence between device parameters of a mobile telephone and signal parameters of a signal transmitted and/or received by the mobile telephone.

According to one embodiment of the invention, in each case, the measurements of all signal-parameter values of the signal transmitted by the respective mobile telephone, which are associated respectively with an identical frequency and a different device-parameter value of a device parameter, are implemented before or after the measurements of all of the signal-parameter values of the signal received by the respective mobile telephone, which are associated respectively with an identical frequency and a different device-parameter value of a device parameter.

According to a further embodiment, the invention provides a system for determining the dependence between several device-parameter values in each case of at least one device parameter in at least one mobile telephone and at least one signal parameter of a signal transmitted and/or received by the respective mobile telephone with a measuring instrument and at least one mobile telephone, which generates a transmitted and/or received signal respectively for a given number of specified frequencies and for a given number of device-parameter values of device parameters set in the respective mobile telephone, wherein all of the frequencies and the device-parameter values of at least one device parameter respectively associated with each frequency are present in every mobile telephone at the start of the measurements.

In the method according to the invention and in the system according to the invention for determining the dependence between device parameters of a mobile telephone and signal parameters of a signal transmitted and/or received by the mobile telephone, all of the frequencies and signal levels of the signal transmitted and received by the mobile telephone and all of the device-parameter values of all of the device parameters, which can be set in the mobile telephone during the type testing, are already present either in the mobile telephone or in the measuring instrument at the start of the tests.

These parameter values can be stored in advance in the mobile telephone or respectively in the measuring instrument and, after a triggering of the mobile telephone or respectively the measuring instrument via an external triggering source, can be adjusted successively from the mobile telephone or respectively from the measuring instrument during the course of the type testing.

Alternatively, the individual parameter values are stored in the mobile telephone or respectively in the measuring instrument at the start of testing by a superordinate procedural-control unit, and, after successful storage, the individual tests are initiated with an adjustment of the first parameter set.

A synchronized testing procedure between the mobile telephone and the measuring instrument is guaranteed by the simultaneous transmission from the superordinate procedural-control unit of a synchronization signal to the mobile telephone and respectively to the measuring instrument.

With a total of 4 frequency bands, 10 transmission channels per frequency band and 5 device-parameter values of a device parameter for each transmission channel, the overall testing time of 30 to 80 seconds according to the prior art is reduced to less than 1 second with the method and the system according to the invention for determining the dependence between device parameters of a mobile telephone and signal parameters of a signal transmitted and/or received by the mobile telephone.

The procedure of the method according to the invention can be realized in several embodiments.

In a first embodiment of the method according to the invention, the individual signal parameters of the transmitted signal are registered, and immediately following this, the individual signal parameters of the received signal are registered, in each case for one set frequency of the transmitted and received signal and for one set device-parameter value of a given device parameter.

In a second embodiment of the method according to the invention, in each case for one identically-set frequency of the transmitted and received signal and for one set device-parameter value of a given device parameter, the individual signal parameters of the transmitted and received signal are registered simultaneously in that the measuring instrument transmits a test signal corresponding to the frequency and signal level of the received signal, in each case via different connecting lines, to the mobile telephone, and, at the same time, the mobile telephone transmits a transmission signal to the measuring instrument.

In a third embodiment of the method according to the invention, the individual signal parameters of the transmitted signal are registered either coherently or in the reverse sequence initially at all set frequencies of the transmitted signal and at all set device-parameter values of all device parameters to be set, and following this, the individual signal parameters of the received signal are registered either coherently or in the reverse sequence at all set frequencies of the received signal and at all set device-parameter values of all device parameters to be set.

In a fourth embodiment of the method according to the invention, the individual signal parameters of the transmitted signal are initially registered at the same time, at a set frequency value of the transmitted signal and the received signal and with all set device-parameter values of all device parameters to be set, and following this, the individual signal parameters of the received signal are registered either coherently or in reverse sequence with an identically-set frequency value with all set device-parameter values of all device parameters to be set, before the individual signal parameters of the transmitted and received signal are then registered in a similar manner at a further frequency value.

In a first sub-embodiment variant of the first, second, third or fourth embodiment of the method according to the invention, all adjustable frequencies of the transmitted and/or received signal are adjusted for one set device-parameter value of one device parameter adjustable in the mobile telephone, and the associated signal parameters of the transmitted and/or received signal relevant for type testing are measured, before all adjustable frequencies of the transmitted and/or received signal are then adjusted successively for the further device-parameter values of all adjustable device parameters, and the associated signal parameters of the transmitted and/or received signal are measured.

In a second sub-embodiment variant of the first, second, third or fourth embodiment of the method according to the invention, all adjustable device-parameter values of the device parameters adjustable for the test are set in each case for one frequency of the signal transmitted and/or received by the mobile telephone, and the associated signal parameters of the transmitted and/or received signal relevant for type testing are measured, before all adjustable device-parameter values of all adjustable device parameters are then adjusted successively for the further adjustable frequencies of the transmitted and/or received signal, and the associated signal parameters of the transmitted and/or received signal are measured.

For reasons of efficiency, the variation of the device-parameter values of each device parameter adjustable in the mobile telephone are adjusted either decrementally or incrementally.

A timeslot is provided in each case for the measurement of the individual signal parameters of the transmitted or received signal or in the case of a simultaneous measurement of the transmitted or received signal. The timeslots for the individual measurements are either arranged immediately following one another or separated by one or more timeslots without a measurement of a signal parameter of the transmitted or received signal.

In the case of a variation of the adjustable frequency of the transmitted and/or received signal, a timeslot without a measurement of one of the signal parameters of the transmitted and/or received signal can be provided.

In a first embodiment of the system according to the invention, the measuring instrument and the mobile telephone are initialized, triggered and synchronized at the start of the measurements by a superordinate procedural-control unit, and an evaluation of the measured values is implemented at the end of the measurements.

A second embodiment of the system according to the invention allows an initialization, triggering, synchronization and measurement of the signal parameters of the transmitted and/or received signal between the measuring instrument and the mobile telephone via two transmission channels without the intermediate connection of a superordinate procedural-control unit.

A third embodiment of the system according to the invention allows an initialization, triggering, synchronization and measurement of the signal parameters of the transmitted and/or received signal between the measuring instrument and the mobile telephone via one transmission channel without the intermediate connection of a superordinate procedural-control unit.

The first embodiment of a system according to the invention for parallel determination of the dependence between device parameters of several mobile telephones and signal parameters of the signal transmitted and/or received by the respective mobile telephone allows the measurements of the signal parameters of the transmitted and received signal respectively from a total of n mobile telephones via n test units, n ports and n connecting lines.

The second embodiment of the system according to the invention for parallel determination of the dependence between device parameters of several mobile telephones and signal parameters of the signal received by the respective mobile telephone allows the measurement of the signal parameters of the received signal respectively from a total of n mobile telephones via 1 test unit, 1 port and n connecting lines.

BRIEF DESCRIPTION OF THE DRAWINGS

Embodiments of the method and the system according to the invention for determining the dependence between device parameters of a mobile telephone and signal parameters of a signal transmitted and/or received by the mobile telephone are explained in greater detail below with reference to the drawings. The drawings are as follows:

FIG. 8 shows a time-dependency diagram for the first embodiment of the method according to the invention for determining the dependence between device parameters of a mobile telephone and signal parameters of a signal transmitted by the mobile telephone;

DETAILED DESCRIPTION

Figure 1:
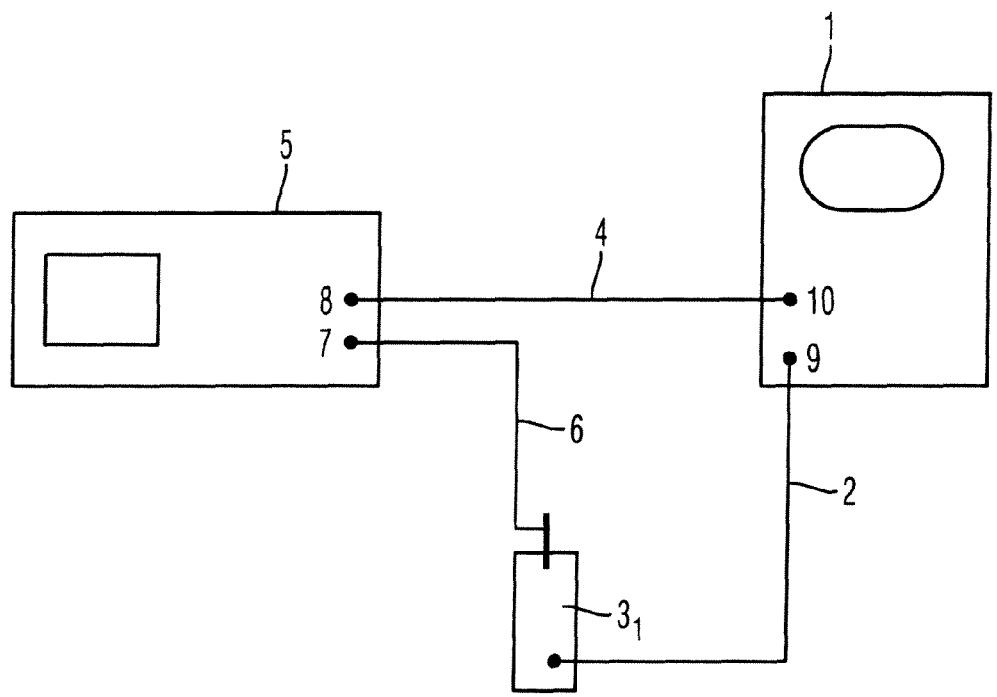
FIG. 1 shows a block-circuit diagram of a first embodiment of a system according to the invention for determining the dependence between device parameters of a mobile telephone and signal parameters of a signal transmitted and/or received by the mobile telephone.

Starting from FIG. 1, which presents the block-circuit diagram of a first sub-embodiment variant of the first embodiment of the system according to the invention for determining the dependence between device parameters of a mobile telephone and signal parameters of a signal transmitted and/or received by the mobile telephone, the following section describes the first sub-embodiment variant of the first embodiment of the method according to the invention for determining the dependence between device parameters of a mobile telephone and signal parameters of a signal transmitted and/or received by the mobile telephone:

In procedural stage S10 of the method according to the invention, the signal level and frequencies of the transmitted signal of the mobile telephone, which are associated with fixed transmission channels in the individual frequency bands, and the device-parameter values to be set, which are associated with the individual device parameters, are transmitted by the superordinate procedural-control unit 1 via the port 9 and the connecting line 2 to the mobile telephone $3_1$, and the signal level and the frequencies of the received signal of the mobile telephone, which are associated with fixed reception channels in the individual frequency bands, are transmitted via the port 10 and the connecting line 4 to the measuring instrument 5. These data transmissions to the mobile telephone $3_1$ and the measuring instrument 5 can be implemented either in a preliminary phase before the measurements or at the start of the measurements.

In the next procedural stage S20, the start of the measurements is implemented by triggering the mobile telephone $3_1$ and the measuring instrument 5. In the case of a data transmission at the start of the measurements, the mobile telephone $3_1$ and the measuring instrument 5 are triggered by the data-transmission event. If the data have already been transmitted and are present in the mobile telephone device $3_1$ and in the measuring instrument 5, the individual measurements must be started by an additional, external triggering signal from the superordinate procedural-control unit 1. The transmission of a synchronization signal from the superordinate procedural-control unit 1 to the mobile telephone $3_1$ and to the measuring instrument 5 is additionally implemented in procedural stage S20. In this manner, the mobile telephone $3_1$ is self-synchronized with the measuring instrument 5 and with the superordinate procedural-control unit 1. In this case, an additional Device—an additional triggering or synchronization unit—for continuous synchronization of the measuring instrument 5 with the mobile telephone $3_1$ is not required.

In procedural stage S30, the first measurement is prepared by setting the signal level and the first frequency value of the transmission signal and the first device-parameter value for the first device parameter to be set in the mobile telephone $3_1$ and by setting the signal level and the first frequency value of a test signal in the measuring instrument 5, which is received by the mobile telephone $3_1$ as a received signal.

Figure 9:
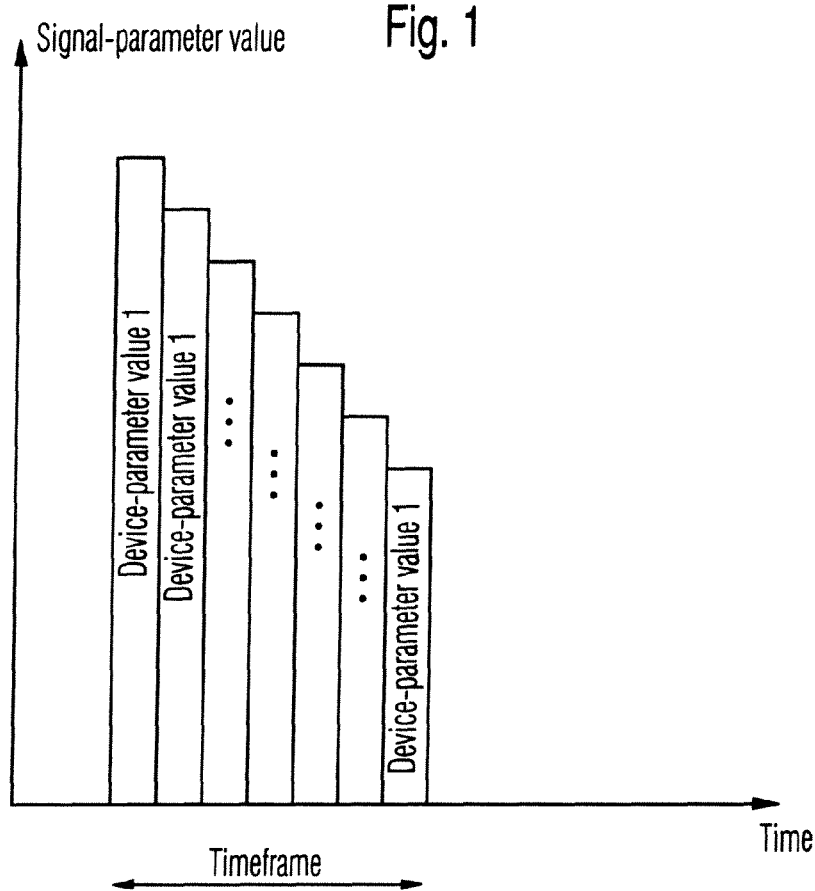
FIG. 9 shows a time-dependency diagram with several timeslots following in direct succession within a timeframe.

In the next procedural stage S40, the transmission signal prepared in the preceding procedural stage S30 is transmitted by the mobile telephone $3_1$ via the connecting line 6 to the measuring instrument 5. This transmission signal is registered by the measuring instrument 5 at its ports 7 with regard to one or more signal parameters—signal level, frequency, phase etc. Further combined signal parameters—for example, EVM, CDP etc—are determined from the measured signal parameters via a signal processing implemented in the measuring instrument 5. A timeslot is provided in each case as the measuring time for registering a signal parameter within a timeframe as shown in FIG. 9.

In a similar manner, in the next procedural stage S50, the measuring instrument 5 transmits the test signal corresponding to the received signal prepared in procedural stage S30 via the same port 7 and the same connecting line 6 to the mobile telephone $3_1$. The test signal transmitted by the measuring instrument 5 is received by the mobile telephone $3_1$ as a received signal and registered with regard to one or more signal parameters, from which further combined signal parameters are determined in the mobile telephone $3_1$ via a signal processing unit.

In the next procedural stage S60, the next device-parameter value of the first device parameter is set in the mobile telephone $3_1$, and the measurement of the signal parameters of the transmitted and received signal associated with this device-parameter value of the first device parameter is measured or respectively determined in procedural stages S40 and S50.

In procedural stage S60, when all of the signal parameters of the transmitted and received signal associated with all of the device-parameter values of the first device parameter have been registered, the first device-parameter value of the next device parameter is set in the mobile telephone $3_1$, and the associated signal parameters of the transmitted and received signal are determined in procedural stages S40 and S50.

In the next procedural stage S70, as soon as all device-parameter values of every device parameter have been set and the associated signal parameters of the transmitted and received signal have been measured, the next frequency value of the transmitted and received signal from the measuring instrument 5 and respectively from the mobile telephones $3_1$ and, once again, the first device-parameter value of the first device parameter are set in the mobile telephone device $3_1$, and accordingly, the signal parameters of the transmitted and received signal, which are set at the next frequency value of the transmitted and received signal and with the first device-parameter value of the first device parameter, must again be registered in procedural stages S40 and S50.

Finally, when the signal parameters of the transmitted and received signal associated respectively with all frequency values and every device-parameter value of every device parameter have been registered in the mobile telephone $3_1$ and the measuring instrument 5, the correctness of the individual measured signal parameters of the transmitted and received signal can be checked in an optional procedural stage S80. For this purpose, the individual measured signal parameters of the transmitted and received signal are typically supplied from the mobile telephone $3_1$ via the connecting line 2 and the port 9 and from the measuring instrument 5 via the port 8, the connecting line 4 and the port 10 to the superordinate procedural-control unit 1 and compared in each case with two threshold values defining the tolerance range for the respective signal parameter, which are stored in the superordinate procedural-control unit 1.

Figure 3:
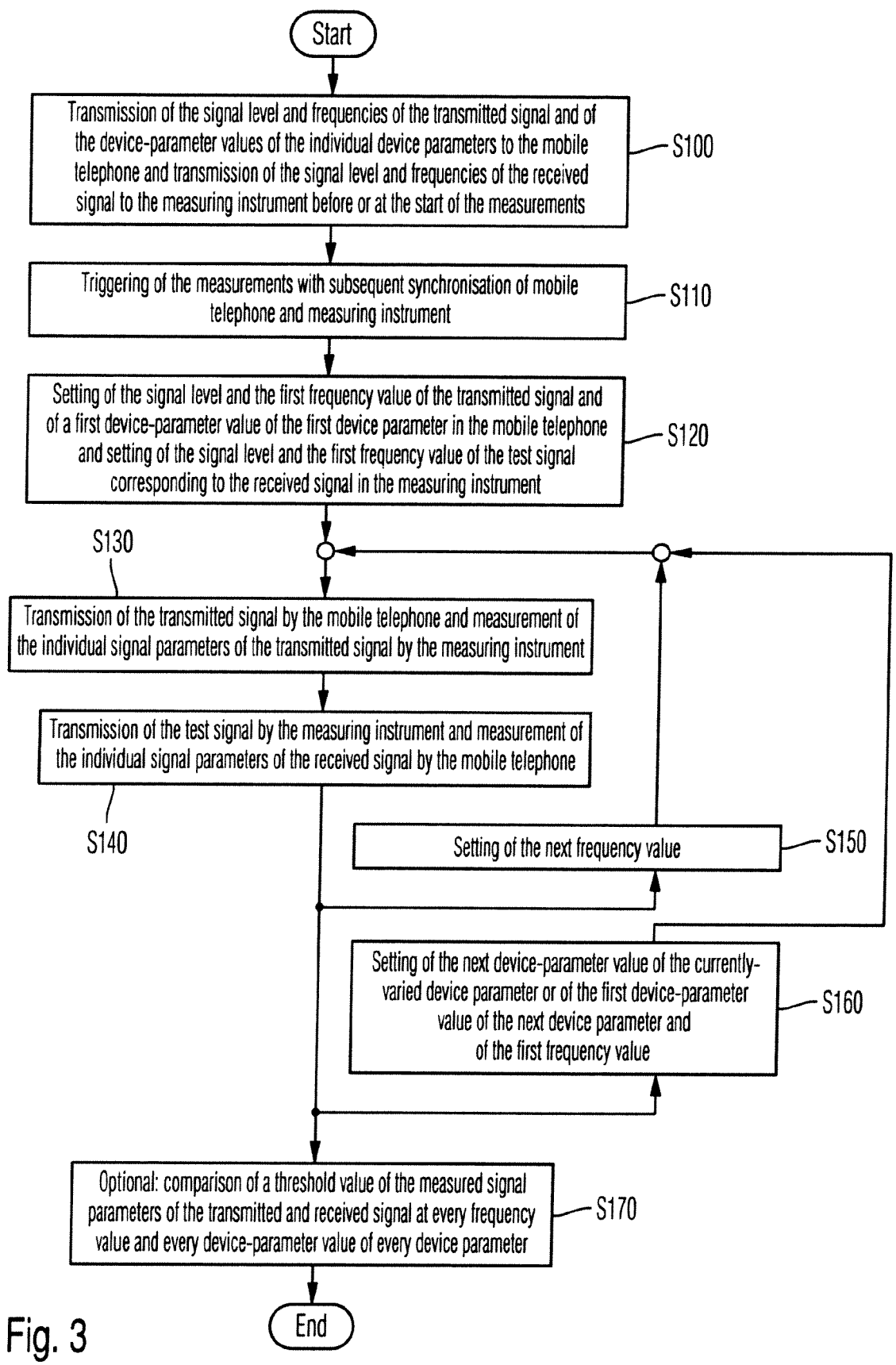
FIG. 3 shows a flow chart of a second sub-embodiment variant of a first embodiment of the method according to the invention for determining the dependence between device parameters of a mobile telephone and signal parameters of a signal transmitted and/or received by the mobile telephone.

A second sub-embodiment variant of the first embodiment of the method according to the invention for determining the dependence between device parameters of a mobile telephone and signal parameters of the signal transmitted and/or received by the mobile telephone, for which a flow chart is shown in FIG. 3, differs from the first sub-embodiment variant of the first embodiment of the method according to the invention in that, instead of varying the individual device-parameter values of the individual device parameters in procedural stage S60, the individual frequency values are first tuned in procedural stage S150 and, instead of varying the individual frequency values in procedural stage S70, the individual device-parameter values of the individual device parameters are then tuned in procedural stage S160.

Figure 2:
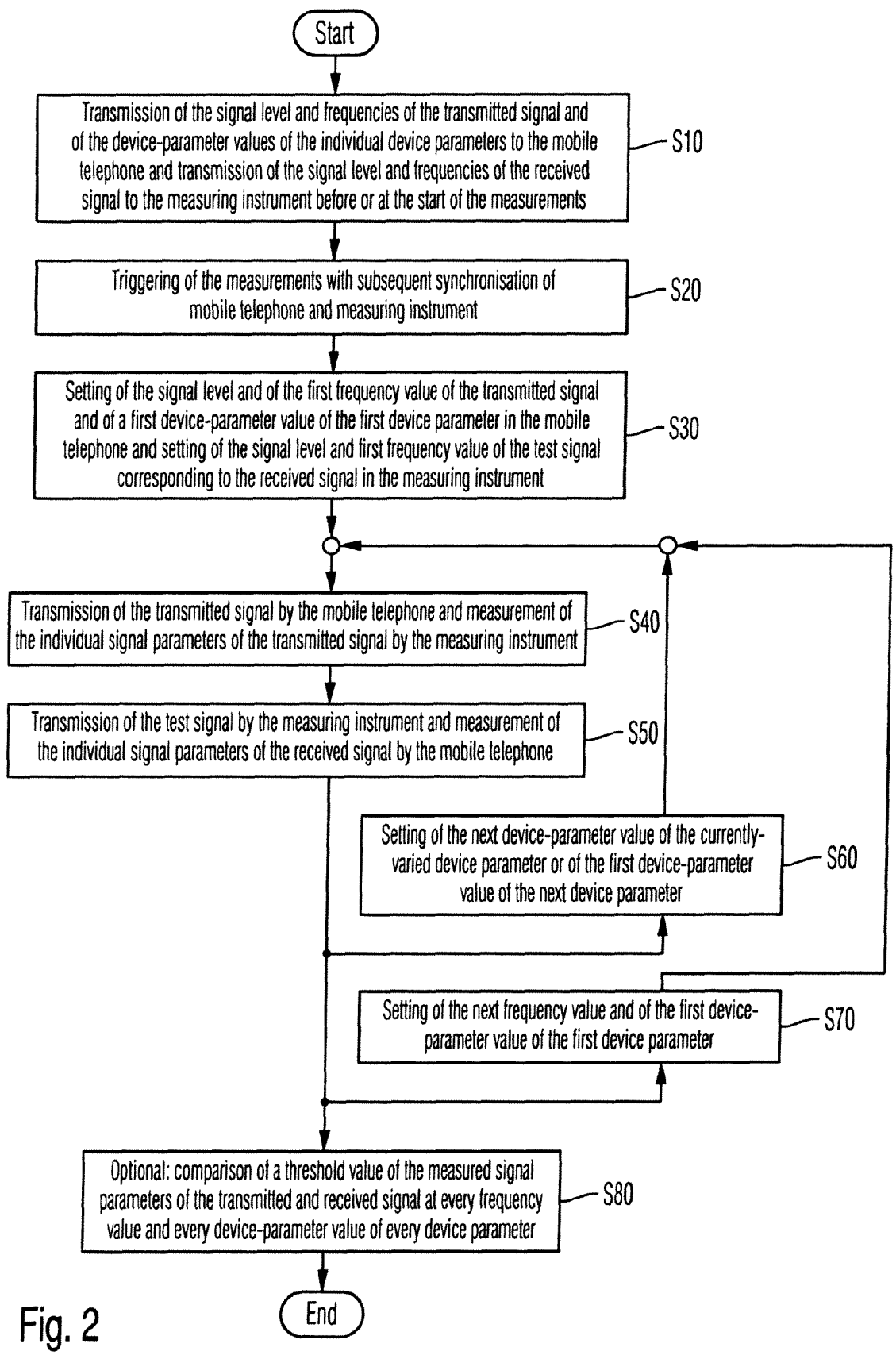
FIG. 2 shows a flow chart of a first sub-embodiment variant of a first embodiment of the method according to the invention for determining the dependence between device parameters of a mobile telephone and signal parameters of a signal transmitted and/or received by the mobile telephone.

The other procedural stages S100, S120, S130, S140 and S170 of the second sub-embodiment variant of the first embodiment of the method according to the invention in FIG. 3 correspond to procedural stages S10, S20, S30, S40, S50 and S80 of the first sub-embodiment variant of the first embodiment of the method according to the invention shown in FIG. 2, and further description will therefore not be provided.

Figure 4:
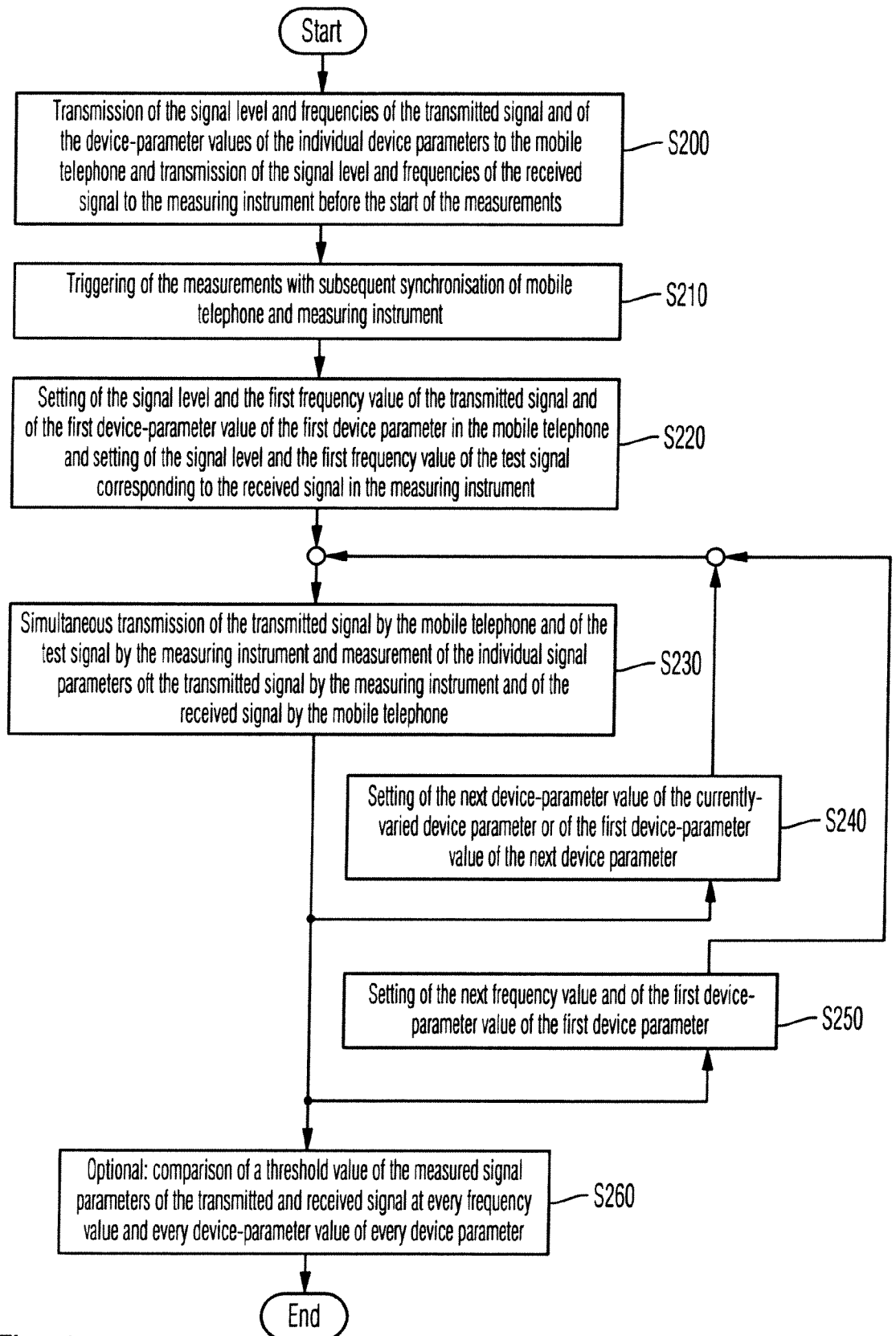
FIG. 4 shows a flow chart of a second embodiment of the method according to the invention for determining the dependence between device parameters of a mobile telephone and signal parameters of a signal transmitted and/or received by the mobile telephone.

In the case of the second embodiment of the method according to the invention for determining the dependence between device-parameters of a mobile telephone and signal parameters of the signal transmitted and/or received by the mobile telephone as shown in FIG. 4, the individual signal parameters of a transmitted and received signal are measured simultaneously in each case within one timeslot.

Figure 12:
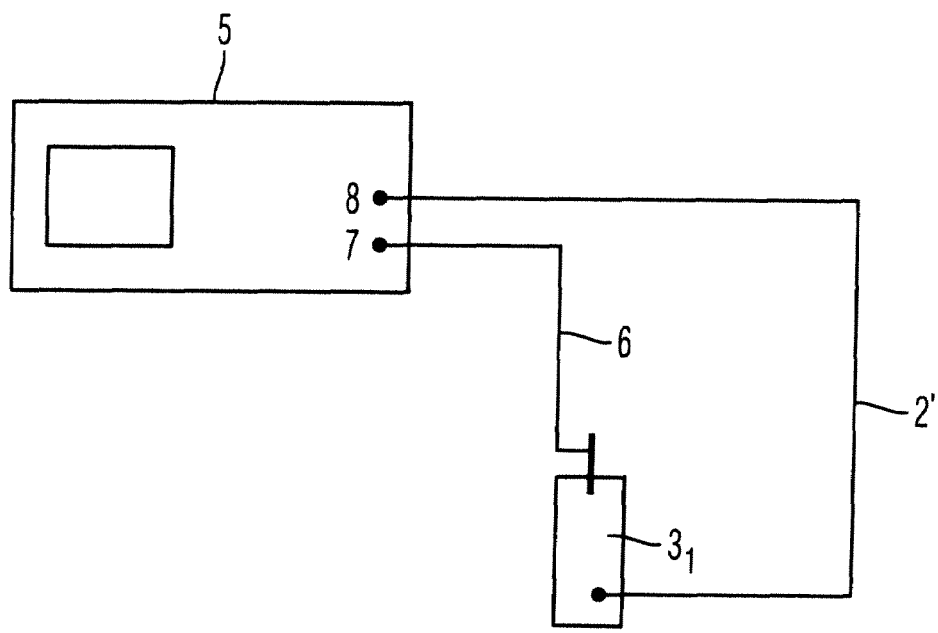
FIG. 12 shows a block-circuit diagram of a second embodiment of a system according to the invention for determining the dependence between device parameters of a mobile telephone and signal parameters of a signal transmitted and/or received by the mobile telephone.

Two connecting lines 2' and 6 are required for the simultaneous measurements between the mobile telephone $3_1$ and the measuring instrument 5 according to the second embodiment of the system according to the invention for determining the dependence between device parameters of a mobile telephone and signal parameters of a signal transmitted and/or received by the mobile telephone as shown in FIG. 12.

A superordinate procedural-control unit 1 is not provided in the second embodiment of the system according to the invention. The signal level and the individual frequency values of the transmitted and received signal and the individual device-parameter values of the individual device parameters must therefore already be stored in the mobile telephone $3_1$ before the start of the measurements in the measuring instrument 5 and in the mobile telephone $3_1$. The start of measurements is implemented by mutual triggering and mutual synchronization between the mobile telephone $3_1$ and the measuring instrument 5.

In the case of the first sub-embodiment variant of the second embodiment of the method according to the invention for determining the dependence between device-parameters of a mobile telephone and signal parameters of a signal transmitted and/or received by the mobile telephone, the procedural stages S40 and S50, in which the individual signal parameters of the transmitted and received signal are measured for every set signal level and every set frequency of the transmitted and received signal and for every set device-parameter value of the individual device parameters to be set, are combined in a procedural stage S230, in which the transmission signal is transmitted by the mobile telephone $3_1$ and measured by the measuring instrument 5, and the test signal corresponding to the received signal is simultaneously transmitted by the measuring instrument 5 and measured by the mobile telephone $3_1$ as a received signal.

Procedural stages S200, S210, S220, S240, S250 and S260 of the first sub-embodiment variant of the second embodiment of the method according to the invention shown in FIG. 4 correspond to procedural stages S10, S20, S30, S60, S70 and S80 of the first sub-embodiment variant of the first embodiment of the method according to the invention shown in FIG. 2, and further description is therefore not provided.

The second sub-embodiment variant of the second embodiment of the method according to the invention for determining the dependence between device parameters of a mobile telephone and signal parameters of the signal transmitted and/or received by the mobile telephone, in which the transmitted and received signals are measured simultaneously, and the individual frequency values are tuned in a first iterative loop, and the individual device-parameter values of the individual device parameters are tuned in a second iterative loop superimposed over the first iterative loop, is derived from a combination of procedural stages S200, S210, S220, S230 of the first sub-embodiment variant of the second embodiment of the method according to the invention shown in FIG. 4 with procedural stages S150 and S160 of the second sub-embodiment variant of the first embodiment of the method according to the invention shown in FIG. 3 and is therefore not illustrated in further diagrams of the drawings or described in any greater detail.

Figure 5:
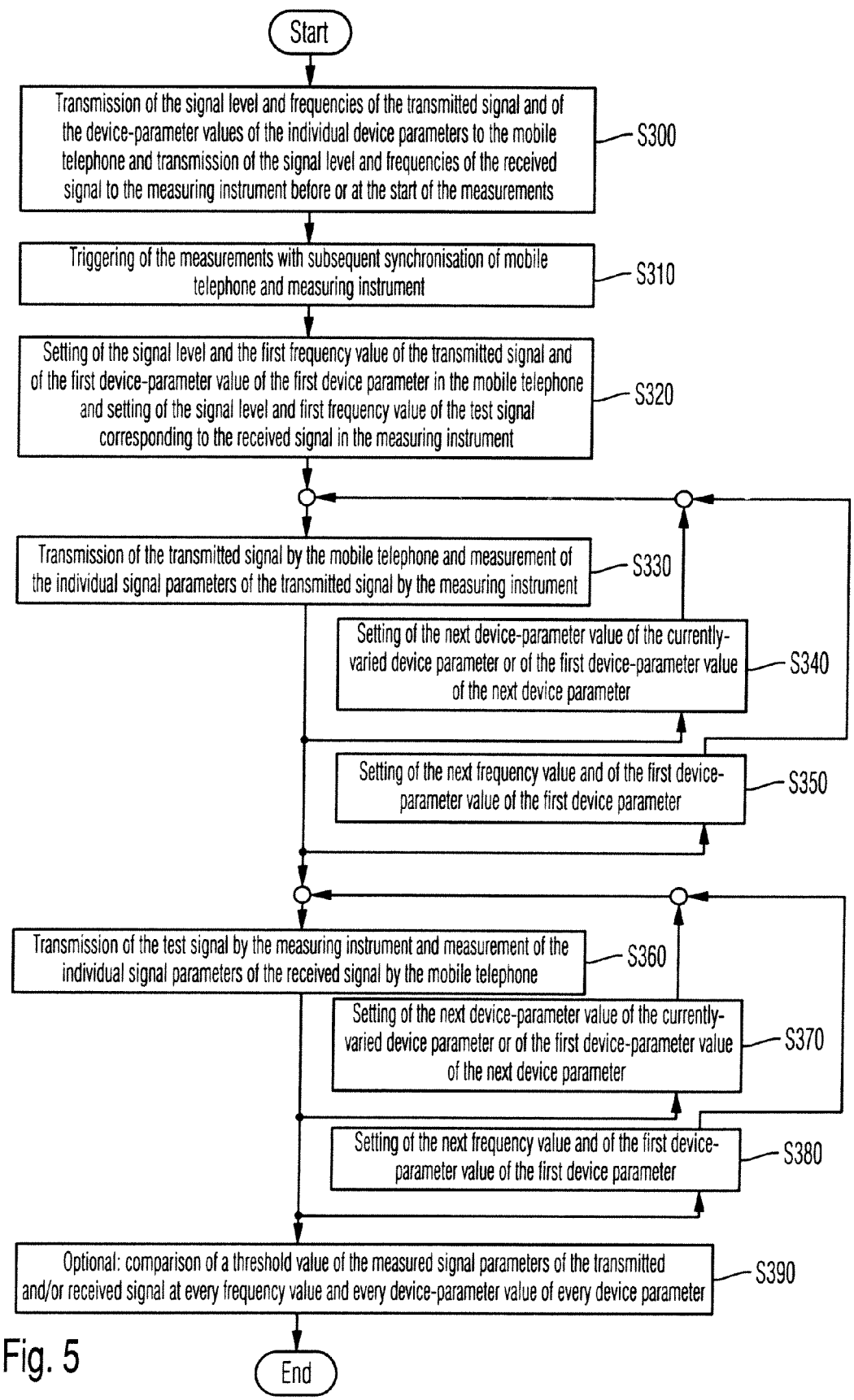
FIG. 5 shows a flow chart of a third embodiment of the method according to the invention for determining the dependence between device parameters of a mobile telephone and signal parameters of a signal transmitted and received by the mobile telephone.

In the case of the first sub-embodiment variant of the third embodiment of the method according to the invention for determining the dependence between device parameters of a mobile telephone and signal parameters of the signal transmitted and/or received by the mobile telephone shown in FIG. 5, the individual associated signal parameters of the transmitted signal are first measured, and following this, the individual associated signal parameters of the received signal are measured respectively for every set signal level and every set frequency and for every set device-parameter value of every device parameter adjustable in the mobile telephone $3_1$.

Procedural stages S300, S310, S320, S330, S340, S350 and S390 of the first sub-embodiment variant of the third embodiment of the method according to the invention shown in FIG. 5 correspond to procedural stages S10, S20, S30, S40, S50, S60, S70 and S80 of the first sub-embodiment variant of the first embodiment of the method according to the invention shown in FIG. 2, and no further description is therefore provided. Procedural stages S360, S370 and S380 of the first sub-embodiment of variant of the third embodiment of the method according to the invention, which relate to the variation of the individual frequencies and of the individual device-parameter values of the individual adjustable device parameters and to the measurement of the individual signal parameters of the received signal, correspond to procedural stages S330, S340 and S350 for the variation of the individual frequencies and the individual device-parameter values of the individual adjustable device parameters and for the measurement of the individual signal parameters of the transmitted signal.

The first sub-embodiment variant of the third embodiment of the method according to the invention, in which the individual signal parameters of the received signal are first measured, and following this, the individual signal parameters of the transmitted signal are measured, merely leads to a switching of procedural stages S330 to S350 with procedural stages S360 to S380 in the flow chart of FIG. 5.

The second sub-embodiment variant of the third embodiment of the method according to the invention for determining the dependence between device parameters of a mobile telephone and signal parameters of a signal transmitted and/or received by the mobile telephone, in which the individual frequency values are initially tuned in each case within an iterative loop for the measurement of the individual signal parameters of the transmitted and received signal, and following this, the individual device-parameter values of the individual adjustable device parameters are tuned in a second iterative loop superimposed over the first iterative loop, is derived by switching the sequence of procedural stage S340 with S350 and procedural stage S370 with S380.

Figure 6:
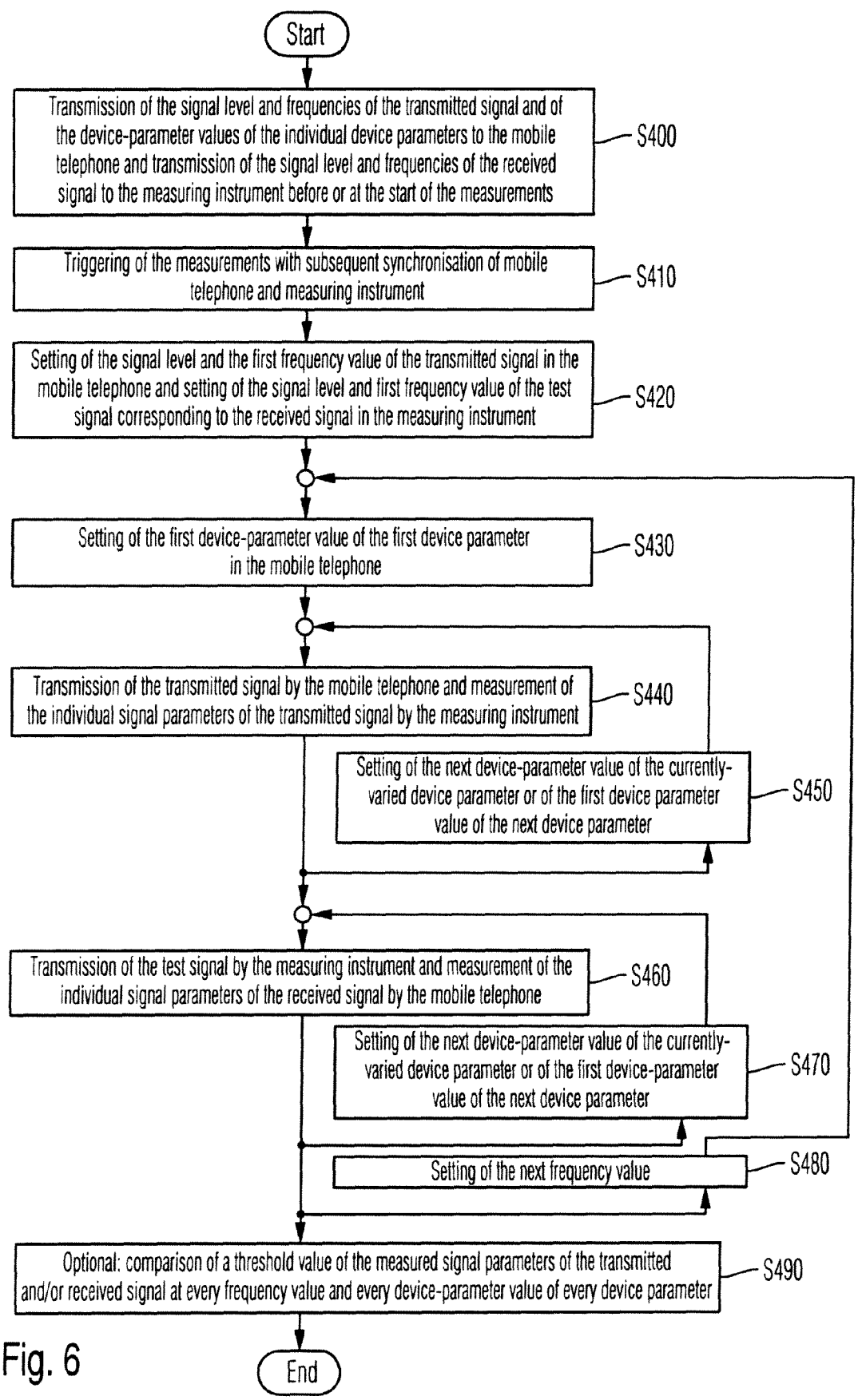
FIG. 6 shows a flow chart of a fourth embodiment of the method according to the invention for determining the dependence between device parameters of a mobile telephone and signal parameters of a signal transmitted and received by the mobile telephone.

In the first sub-embodiment variant of the fourth embodiment of the method according to the invention for determining the dependence between device parameters of a mobile telephone and signal parameters of a signal transmitted and/or received by the mobile telephone as shown in FIG. 6, by analogy with the first sub-embodiment variant of the third embodiment of the method according to the invention as shown in FIG. 5, the individual signal parameters of the transmitted signal are initially measured respectively at tuned device-parameter values of the individual device parameters, and following this, the individual signal parameters of the received signal are measured respectively at tuned device-parameter values of the individual device parameters, before the individual frequency values for the measurement of the individual signal parameters of the transmitted signal and also of the received signal are jointly tuned in a further iterative loop. Procedural stages S350 and S380 of the first sub-embodiment variant of the third embodiment of the method according to the invention for varying the individual frequency values are consequently merged into a single procedural stage S480 in the first sub-embodiment variant of the fourth embodiment of the method according to the invention. Procedural stages S400, S410, S440, S450, S460, S470 and S480 of the first sub-embodiment variant of the fourth embodiment of the method according to the invention therefore correspond to procedural stages S300, S310, S340, S360, S370 and S380 of the first sub-embodiment variant of the third embodiment of the method according to the invention, and further description is therefore not provided. The content of procedural stage S320 of the first sub-embodiment variant of the third embodiment of the method according to the invention is subdivided into the two procedural stages S440 and S450 of the first sub-embodiment variant of the fourth embodiment of the method according to the invention.

The first sub-embodiment variant of the fourth embodiment of the method according to the invention, in which the individual signal parameters of the received signal are initially measured, and following this, the individual signal parameters of the transmitted signal are measured, merely leads to a switching of procedural stages S440 to S450 with procedural stages S470 to S480 in the flow chart shown in FIG. 6.

The second sub-embodiment variant of the fourth embodiment of the method according to the invention for determining the dependence between device parameters of a mobile telephone and signal parameters of a signal transmitted and/or received by the mobile telephone, in which the individual frequency values are tuned respectively in an iterative loop in order to measure the individual signal parameters of the transmitted and received signal, and following this, the individual device-parameter values of the individual adjustable device parameters are tuned in a second iterative loop superimposed over the first iterative loop, is derived by switching the contents of procedural stages S450 and respectively S470 with the content of procedural stage S480 of the first sub-embodiment variant of the fourth embodiment of the method according to the invention.

Figure 11:
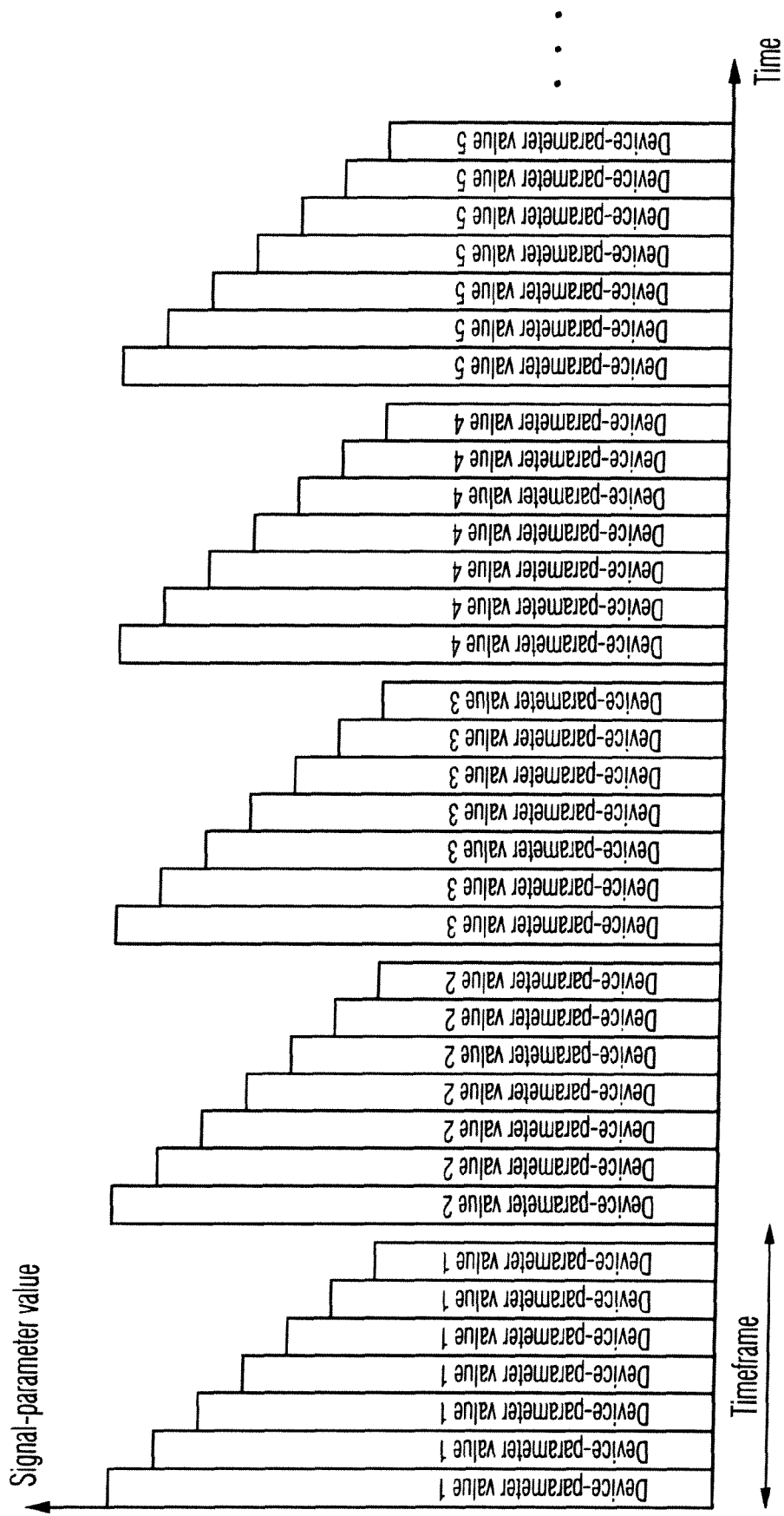
FIG. 11 shows a time-dependency diagram of several timeframes each separated by one timeslot.

As shown in FIG. 11, the measurements of the individual signal parameters of the transmitted or received signal to be implemented for a transmission channel at a given frequency value are disposed in a timeframe consisting respectively of several timeslots for each of the device-parameter values to be tuned for a given device parameter. If device-parameter values to be tuned for a further device parameter must be tuned in order to measure the individual signal parameters of the transmitted and received signal, or if the device-parameter values to be tuned for a device parameter must be tuned for a further frequency value of the transmitted or received signal, as shown in FIG. 11, a further timeframe, which is separated in time from the preceding timeframe by a timeslot without measurement, is provided with new device-parameter values to be tuned for a given device parameter.

The measurements of the individual signal parameters of the transmitted or received signal in the individual timeslots of a timeframe can either follow in direct succession, as shown in FIG. 9, or can be spaced apart in each case by one or more timeslots without measurements.

Figure 7:
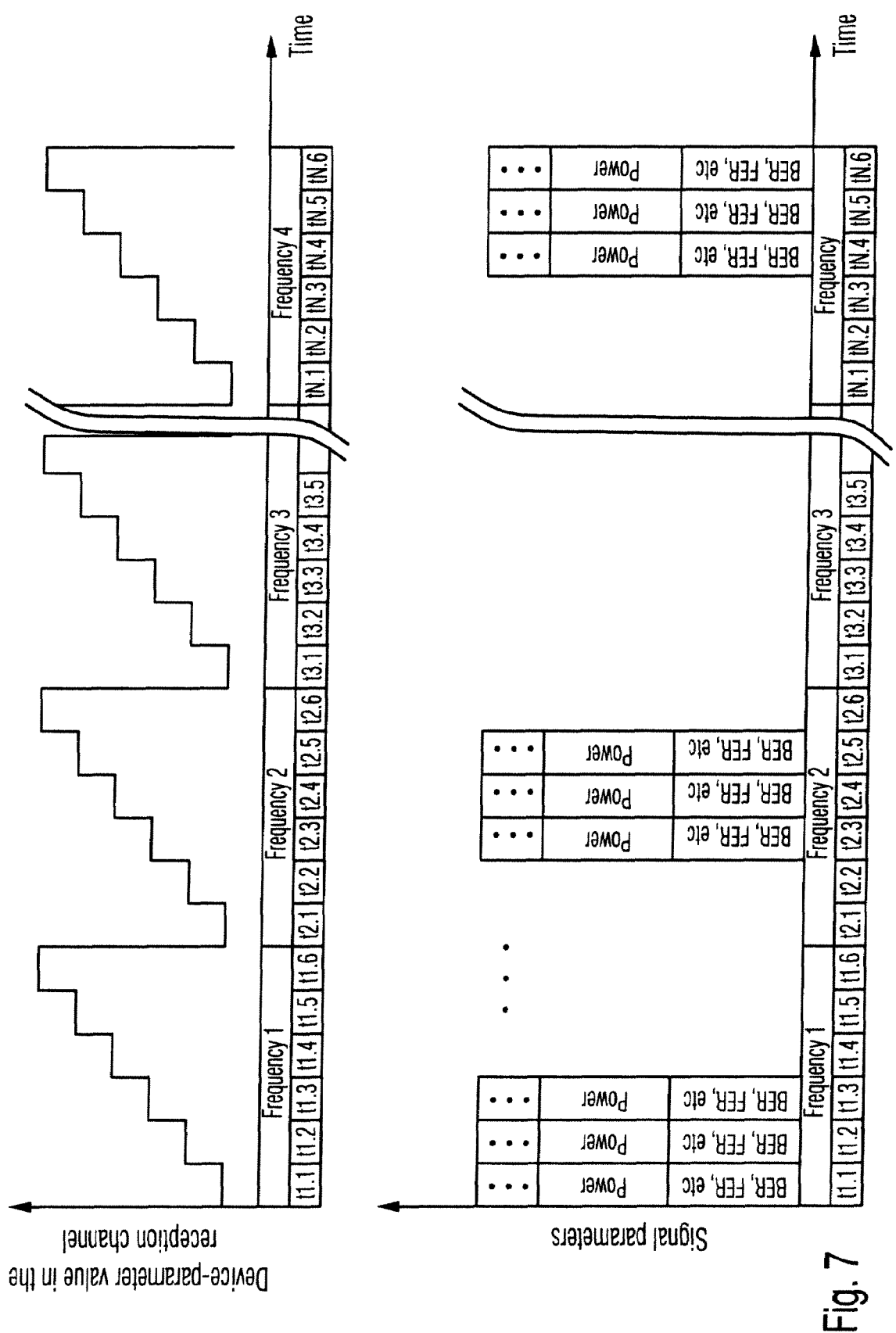
FIG. 7 shows a time-dependency diagram for the first embodiment of the method according to the invention for determining the dependence between the device parameters of a mobile telephone and signal parameters of a signal received by the mobile telephone.

FIG. 7 shows examples of signal parameters of the received signal to be tested with a variation of the device-parameter value of a device parameter adjustable in the reception channel of the mobile telephone $3_1$ and with a variation of the frequency value over time. By analogy, FIG. 8 provides examples of signal parameters of the transmission signal to be tested with a variation of the device-parameter value of a device parameter adjustable within the transmission channel of the mobile telephone $3_1$ and with a variation of the frequency value over time.

Figure 10:
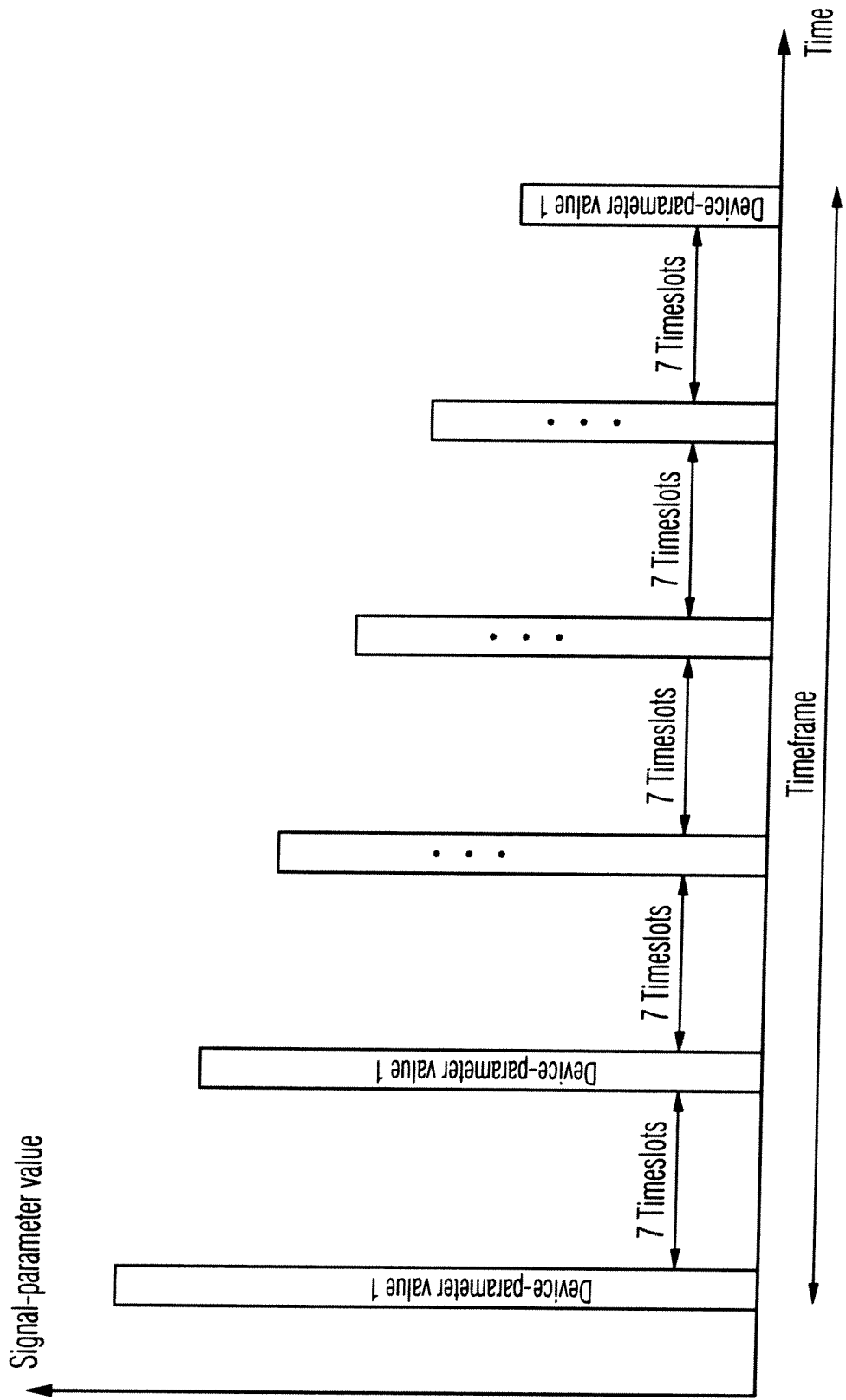
FIG. 10 shows a time-dependency diagram with several timeslots with a spacing distance within a time frame.

The tuning of the individual device-parameter values of a device parameter, which is to be tuned, can be implemented either incrementally—for example, as illustrated in FIGS. 7 and 8—or decrementally—for example, as illustrated in FIGS. 9, 10 and 11.

Figure 13:
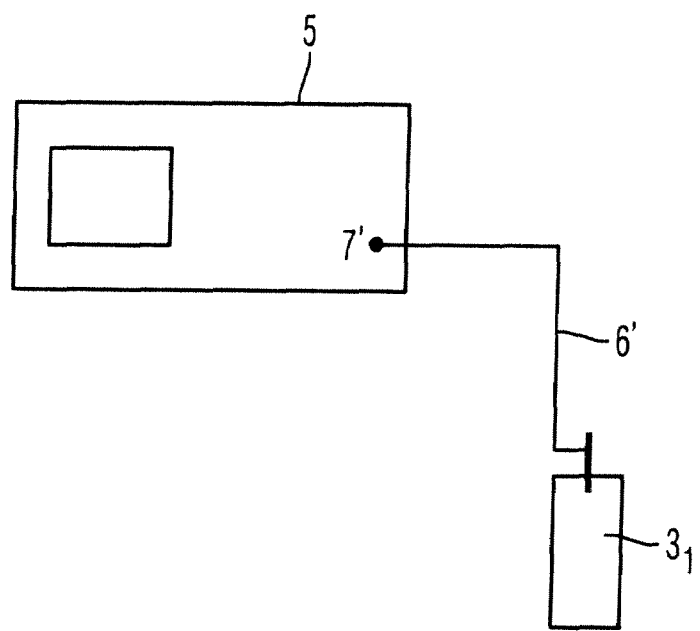
FIG. 13 shows a block-circuit diagram of a third embodiment of the system according to the invention for determining the dependence between device parameters of a mobile telephone and signal parameters of a signal transmitted and/or received by the mobile telephone.

A third embodiment of the system according to the invention for determining the dependence between device parameters of a mobile telephone and signal parameters of a signal transmitted and/or received by the mobile telephone as shown in FIG. 13 differs from the first and second embodiments of the system according to the invention, in that the transmission between the mobile telephone $3_1$ and the measuring instrument 5 is implemented in both directions of the transmission and reception operation of the mobile telephone 3 via a single port 7' and a single connection 6'. Accordingly, the third embodiment of the system according to the invention for simultaneous registration of the individual signal parameters of the transmitted and received signal cannot be used in the second embodiment of the method according to the invention.

Figure 14:
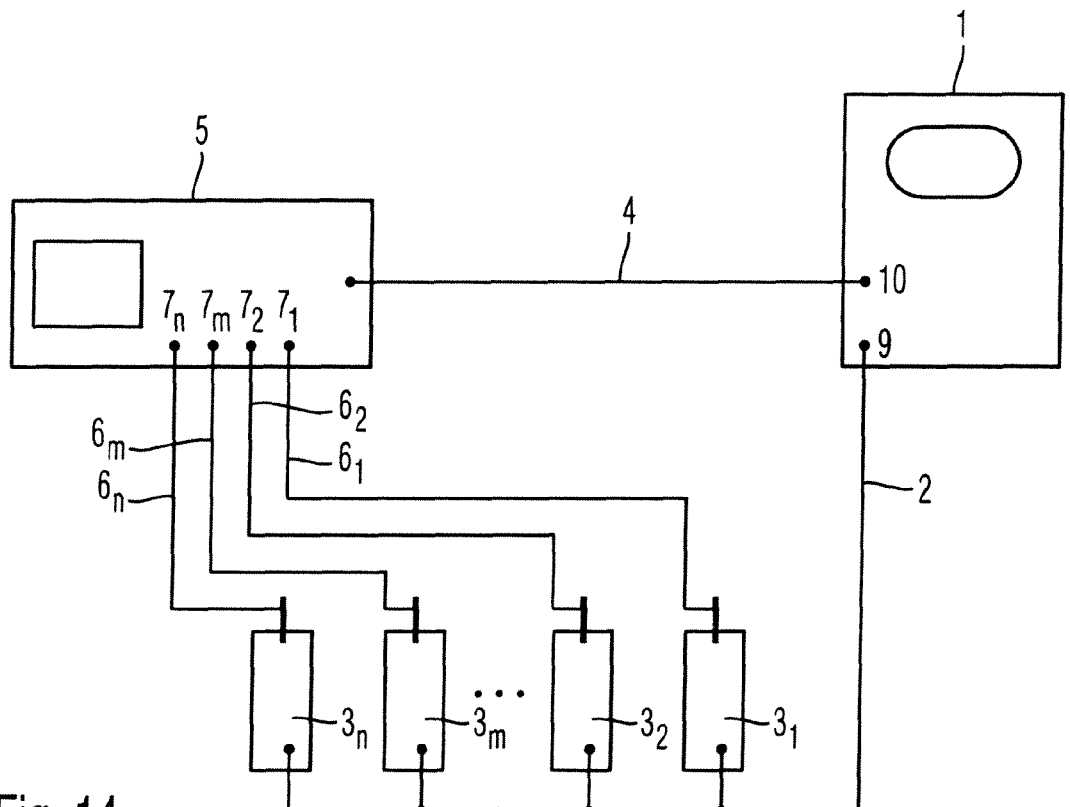
FIG. 14 shows a block-circuit diagram of a first embodiment of a system according to the invention for parallel determination of the dependence between device parameters of several mobile telephones and signal parameters of the signal transmitted and/or received by the respective mobile telephone.

FIG. 14 shows the block-circuit diagram for a system according to the invention for parallel determination of the dependence between device parameters in several mobile telephones $3_1, 3_2, \ldots, 3_m, 3_n$ and signal parameters of a signal transmitted and/or received respectively by several mobile telephones $3_1, 3_2, \ldots, 3_m, 3_n$. Since the measuring instrument 5 provides a total of n test units and n ports $7_1, 7_2, \ldots, 7_m, 7_n$, which are each connected via a connecting line $6_1, 6_2, \ldots, 6_m, 6_n$ to one of the total of n mobile telephones $3_1, 3_2, \ldots, 3_m, 3_n$, a parallel determination of the dependence between device parameters in several mobile telephones $3_1, 3_2, \ldots, 3_m, 3_n$ and signal parameters of a signal transmitted and/or received respectively by several mobile telephones $3_1, 3_2, \ldots, 3_m, 3_n$ is possible.

Within the meaning of procedural stages S10, S100, S200, S300 and S400 of the individual embodiments and their sub-embodiment variants of the method according to the invention as shown in FIGS. 2, 3, 4, 5 and 6, the signal level and the individual frequencies of the transmitted and received signal and the device-parameter values of the individual device parameters to be set in the respective mobile telephone $3_1, 3_2, \ldots, 3_m, 3_n$ are transmitted from the superordinate procedural-control unit 1 respectively via the connecting lines 4 and 2 to the individual test units of the measuring instrument 5 and to the individual mobile telephones $3_1, 3_2, \ldots, 3_m, 3_n$.

After the triggering and synchronization of the measuring instrument 5 with the individual mobile telephones $3_1, 3_2, \ldots, 3_m, 3_n$ in procedural stages S20, S110, S210, S310 and S410 and the setting of the signal level and the first frequency value of the transmitted and received signal in the individual mobile telephones $3_1, 3_2, \ldots, 3_m, 3_n$ and in the measuring instrument 5 and of the device-parameter value of the first device parameter to be set in the transmission or reception channel of the respective mobile telephone $3_1, 3_2, \ldots, 3_m, 3_n$ in procedural stages S30, S120, S220, S320, S420 and S430 as shown in FIGS. 2, 3, 4, 5 and 6, the individual signal parameters of the transmitted and received signal of the individual mobile telephones $3_1, 3_2, \ldots, 3_m, 3_n$ are measured for every individual frequency value and every individual device-parameter value of every device parameter to be set in the individual procedural stages S40 to S70, S130 to S160, S230 to S250, S330 to S380 and S440 to S480 of the individual embodiments and their sub-embodiment variants of the method according to the invention as shown in FIGS. 2, 3, 4, 5 and 6.

Figure 15:
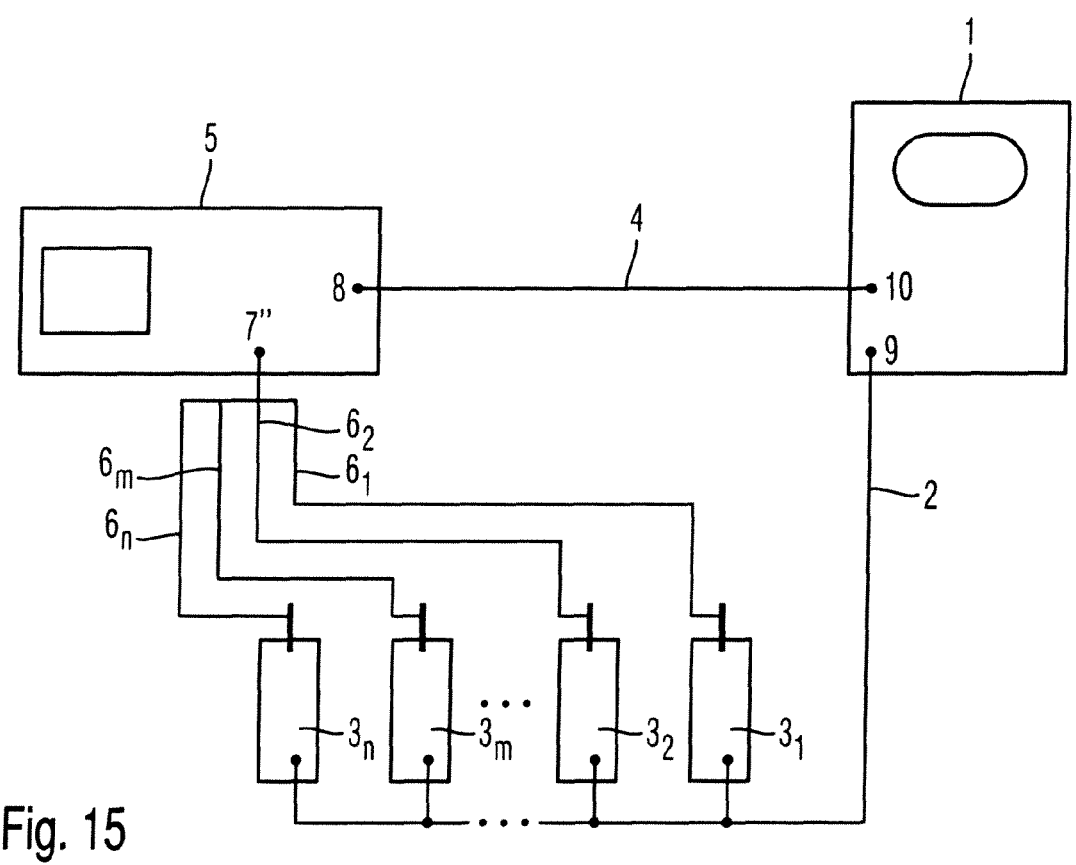
FIG. 15 shows a block-circuit diagram of a second embodiment of the system according to the invention for parallel determination of the dependence between device parameters of several mobile telephones and signal parameters of the signal received by the mobile telephone.

Finally, FIG. 15 shows the block-circuit diagram for a second embodiment of the system according to the invention for parallel determination of the dependence between device parameters in several mobile telephones $3_1, 3_2, \ldots, 3_m, 3_n$ and signal parameters of a signal received respectively by several mobile telephones $3_1, 3_2, \ldots, 3_m, 3_n$, which differs from the first embodiment in that it provides only a single port 7", to which all of the connecting lines $6_1, 6_2, \ldots, 6_m, 6_n$ are supplied. By comparison with the embodiment of the system according to the invention for parallel determination of the dependence between device parameters in several mobile telephones $3_1, 3_2, \ldots, 3_m, 3_n$ and signal parameters of a signal transmitted and/or received respectively by several mobile telephones $3_1, 3_2, \ldots, 3_m, 3_n$ as shown in FIG. 14 with a total of n test units, the measuring instrument 5 in the second embodiment as shown in FIG. 15 provides only a single test unit.

Since all of the mobile telephones $3_1, 3_2, \ldots, 3_m, 3_n$ are supplied at the receiver end with an identical test signal corresponding to the received signal for the determination of the individual signal parameters of the received signal dependent upon the respectively-adjusted device-parameter values of the respective device parameter, this test signal is generated uniquely by the measuring instrument 5, output by the measuring instrument 5 via the single port 7" as shown in FIG. 15 and supplied via the individual connecting lines $6_1, 6_2, \ldots, 6_m, 6_n$ to the individual mobile telephones $3_1, 3_2, \ldots, 3_m, 3_n$.

The invention is not restricted to the embodiments presented. In particular, the invention is not restricted to a given mobile-telephone standard. Mobile telephone devices with several transmission and reception antennae (so-called MIMO systems), and therefore also with several transmission and reception channels, are also covered by the invention.

The invention claimed is:

1. Method for determining the respective dependence between several device-parameter values of at least one device parameter of a mobile telephone and at least one signal parameter of a signal transmitted and/or received by the mobile telephone comprising setting, respectively in at least one mobile telephone several device-parameter values of at least one device parameter of the respective mobile telephone for a given number of frequencies of the transmitted and/or received signal and by measuring the associated signal parameters of a signal transmitted and/or received by the respective mobile telephone, wherein all of the frequencies and the respective device-parameter values of at least one device parameter associated with each frequency are present in the respective mobile telephone at the start of the measurements.

2. Method according to claim 1, wherein, in each case, the measurements of all of the signal-parameter values of the signal transmitted and received by the respective mobile telephone, which are associated respectively with one frequency and one device-parameter value of a device parameter, follow one another in direct succession.

3. Method according to claim 2, wherein, in each case, the measurements of all the signal-parameter values of the signal transmitted and/or received by the respective mobile telephone, which are associated respectively with an identical frequency and a different device-parameter value of the device parameter, follow one another in direct succession.

4. Method according to claim 3, comprising, in each case, implementing the measurements of all signal-parameter values of the signal transmitted by the respective mobile telephone, which are associated respectively with an identical frequency and a different device-parameter value of a device parameter, before or after measuring all of the signal-parameter values of the signal received by the respective mobile telephone which are associated respectively with an identical frequency and a different device-parameter value of a device parameter.

5. Method according to claim 3, comprising, for every specified and mutually-associated frequency of the transmitted and received signal and every device-parameter value of every device parameter, implementing the measurement of the associated signal-parameter value of the transmitted signal simultaneously with measuring the associated signal-parameter value of the received signal.

6. Method according to claim 3, comprising, for every specified and mutually-associated frequency of the transmitted and received signal and every device-parameter value of every device parameter, implementing the measurement of the associated signal-parameter value of the transmitted signal directly before or after measuring the associated signal-parameter value of the received signal.

7. Method according to claim 3, comprising, for the measurement of all of the signal-parameter values of the signal transmitted and/or received by the respective mobile telephone which are associated respectively with an identical frequency, incrementing or decrementing the device-parameter values of the individual device parameters respectively.

8. Method according to claim 1, comprising implementing all of the measurements of the signal parameters of the transmitted and/or received signal, which are associated respectively with every device-parameter value of every device parameter and respectively with one frequency of the transmitted and/or received signal, before all of the measurements of the signal parameters of the transmitted and/or received signal, which are associated respectively with every device-parameter value of every device parameter and respectively with one further frequency of the transmitted and/or received signal.

9. Method according to claim 1, comprising implementing all of the measurements of the signal parameters of the transmitted and/or received signal, which are associated respectively with every device-parameter value of a device parameter and with every specified frequency of the transmitted and/or received signal, before all of the measurements of the signal parameters of the transmitted and/or received signal, which are associated respectively with every device-parameter value of a further device parameter and with every specified frequency of the transmitted and/or received signal.

10. Method according to claim 1, comprising providing a timeslot with a given duration for every measurement of a signal-parameter value of the signal transmitted and/or received, which is generated by the respective mobile telephone.

11. Method according to claim 10, wherein the timeslots for the measurements of the signal-parameter values associated respectively with a specified frequency of the transmitted and/or received signal are directly adjacent to one another within a timeframe.

12. Method according to claim 10, wherein the timeslots for the measurements of the signal-parameter values associated respectively with a specified frequency of the transmitted and/or received signal are arranged within a timeframe separated from one another in time in each case by a given number of time slots, in which no measurement is implemented.

13. Method according to claim 1, comprising, in each case, inserting a time slot, in which no measurement is implemented, in the transition between two specified frequencies of the transmitted and/or received signal.

14. Method according to claim 1, comprising, in the case of frequencies already stored in the respective mobile telephone and device-parameter values of the individual device parameters associated with the respective frequencies, initiating the measurement of the signal-parameter values of the individual signal parameters, which are associated with the individual device-parameter values of the individual device parameters, externally by a triggering of the respective mobile telephone.

15. Method according to claim 1, comprising initiating the measurement of the signal-parameter values of the individual signal parameters associated with the individual device-parameter values of the individual device parameters after storing in the respective mobile telephone the frequencies and the device-parameter values of the individual device parameters associated respectively with the frequencies.

16. Method according to claim 1, comprising, before implementing the individual measurements, synchronizing the respective mobile telephone with a measuring instrument and/or a superordinate procedural-control unit.

17. System for determining the dependence between several device-parameter values in each case of at least one device parameter in at least one mobile telephone and at least one signal parameter of a signal transmitted and/or received by the respective mobile telephone with a measuring instrument and at least one mobile telephone, which generates a transmitted and/or received signal respectively for a given number of specified frequencies and for a given number of device-parameter values of device parameters set in the respective mobile telephone wherein all of the frequencies and the device-parameter values of at least one device parameter respectively associated with each frequency are present in every mobile telephone at the start of the measurements.

18. System according to claim 17, wherein at the start of the measurements, all of the frequencies of the transmitted signal and all of the device-parameter values of every device parameter are supplied to every mobile telephone and all of the frequencies of the received signal are supplied to the measuring instrument from a superordinate procedural-control unit.

19. System according to claim 17 wherein the transmission of the signal transmitted to the measuring instrument from at least one mobile telephone and received respectively is implemented in each case via a line connection.

20. System according to claim 17 wherein the transmission to the measuring instrument of the signal transmitted from a mobile telephone and received is implemented via two line connections.

* * * * *